US012291055B2

(12) United States Patent
Bunch

(10) Patent No.: US 12,291,055 B2
(45) Date of Patent: May 6, 2025

(54) SYSTEMS AND DEVICES FOR TRANSFERRING IMAGES TO WHITE AND LIGHT COLORED ARTICLES

(71) Applicant: Neenah Inc., Alpharetta, GA (US)

(72) Inventor: Abdu Bunch, Marquette, MI (US)

(73) Assignee: NEENAH INC., Alpharetta, GA (US)

( * ) Notice: Subject to any disclaimer, the term of this patent is extended or adjusted under 35 U.S.C. 154(b) by 0 days.

(21) Appl. No.: 18/612,099

(22) Filed: Mar. 21, 2024

(65) Prior Publication Data

US 2024/0316982 A1 Sep. 26, 2024

Related U.S. Application Data

(60) Provisional application No. 63/492,001, filed on Mar. 24, 2023.

(51) Int. Cl.
*B44C 1/17* (2006.01)

(52) U.S. Cl.
CPC ............ *B44C 1/1716* (2013.01); *B44C 1/172* (2013.01)

(58) Field of Classification Search
CPC .............................. B44C 1/1716; B44C 1/172
USPC ......................................................... 428/32.6
See application file for complete search history.

(56) References Cited

U.S. PATENT DOCUMENTS

| | | | | |
|---|---|---|---|---|
| 6,551,692 | B1 | 4/2003 | Dalvey et al. | |
| 2001/0010851 | A1* | 8/2001 | Kita | B41M 5/38257 428/355 RA |
| 2002/0146544 | A1 | 10/2002 | Kronzer | |
| 2003/0008116 | A1* | 1/2003 | Williams | G03G 7/0013 428/195.1 |
| 2003/0021962 | A1 | 1/2003 | Mukherjee et al. | |
| 2004/0072005 | A1* | 4/2004 | German | C08L 23/0815 525/240 |
| 2005/0142307 | A1* | 6/2005 | Kronzer | B44C 1/1729 428/32.51 |
| 2009/0280250 | A1 | 11/2009 | Dolsey | |
| 2013/0115387 | A1* | 5/2013 | Dolsey | B41M 5/5218 428/206 |

FOREIGN PATENT DOCUMENTS

| | | |
|---|---|---|
| JP | H05-77562 A | 3/1993 |

OTHER PUBLICATIONS

International Search Report and Written Opinion; International Application No. PCT/US2024/020872; Aug. 27, 2024.

* cited by examiner

*Primary Examiner* — Betelhem Shewareged
(74) *Attorney, Agent, or Firm* — Farber LLC

(57) ABSTRACT

Transfer assemblies, sheets, and methods for manufacturing the same, are provided for transferring images to articles, such as textiles, fabric or the like. A transfer sheet comprises a support layer, such as a backing paper, and an image transfer layer that includes a binder and an ink receptor. The image transfer layer further includes a release layer between the support layer and the image transfer layer. The release layer comprises a crosslinking agent and is configured so that the image transfer layer can be detached from the backing paper prior to the transfer of the image to the substrate or article. This allows the use of thin parchment paper as the protective cover for the image layer during the transfer process instead of the backing paper, which accelerates and enhances the transfer of heat to the image transfer layer and the article resulting in deeper penetration of the ink.

21 Claims, 5 Drawing Sheets

SYSTEMS AND DEVICES FOR TRANSFERRING IMAGES TO WHITE AND LIGHT COLORED ARTICLES

CROSS-REFERENCE TO RELATED APPLICATIONS

This application claims the benefit of U.S. Provisional Application Ser. No. 63/492,001, filed Mar. 24, 2023, the complete disclosure of which is incorporated herein by reference for all purposes.

TECHNICAL FIELD

This description generally relates to transfer assemblies and transfer sheets for transferring messages, designs, pictures, or other images to articles, such as textiles and other fabrics, and methods for manufacturing the transfer sheets and the articles.

BACKGROUND

In recent years, a significant industry has developed which involves the application of customer-selected designs, words, numbers, messages, illustrations, and the like (referred to collectively hereinafter as "images") on articles, such as T shirts, sweat shirts, leather goods, and the like. These images may be commercially available products tailored for a specific end-use and printed on a release or transfer paper, or the customer may generate the images on a heat transfer paper for white and lightly colored substrates. The transfer sheet is brought in contact with the article, and heat and pressure are applied to a backing layer or paper, causing the image transfer layer to release and flow into the article, along with the printed image.

One drawback with current transfer sheets is that the backing paper must be detached from the article after the image has been transferred to the article, such as a fabric. Since heat and pressure have been applied to the transfer sheet and the article during the transfer process, the backing paper requires significant peel force to remove. The peel force generated by this detachment often causes splitting and disruption of the image after it has been transferred to the fabric. This can have a negative impact on the appearance of the image and make it look different than the printed image.

Another drawback with current transfer sheets is that the backing paper reduces the overall transfer of heat to the image layer and the article, thereby decreasing the depth of penetration of the ink and layer into the article. This reduced penetration of the layer can decrease the overall durability and washability of the article, resulting in a more faded image over time that has more defects consisting of cracks or bursts in the image layers What is needed, therefore, are improved systems and methods for transferring images to white and lightly colored articles, such as fabrics or textiles. In particularly, it would be desirable to provide systems and methods that overcome the limitations of standard backing paper to provide a brighter and more colorful image on the article that can withstand numerous washing and drying cycles over an extended period of time.

SUMMARY

The following presents a simplified summary of the claimed subject matter in order to provide a basic understanding of some aspects of the claimed subject matter. This summary is not an extensive overview of the claimed subject matter. It is intended to neither identify critical elements of the claimed subject matter nor delineate the scope of the claimed subject matter. Its sole purpose is to present some concepts of the claimed subject matter in a simplified form as a prelude to the more detailed description that is presented later.

Various embodiments provide transfer assemblies, transfer sheets, release layers, and backing or support papers for transferring images to articles, such as textiles, fabric or the like, as well as, improved methods for manufacturing transfer sheets and other articles. Such transfer sheets may be used to transfer messages, designs, pictures or other images to any articles or substrates and are particularly useful for transferring images to white or lightly colored fabrics, such as T-shirts, hats, sweatshirts and the like.

In one aspect, a transfer sheet for transferring an image onto a substrate comprises a support layer, such as a backing paper, and an image transfer layer overlying the support layer. The image transfer layer comprises a first layer including a binder and a second layer including an ink receptor. The second layer further comprises first and second components each comprising an ethylene acrylic acid (EAA) copolymer. The second component comprises less than about 20% acrylic acid by weight of the EAA copolymer.

In embodiments, the first layer comprises a tie coat layer and the second layer comprises at least a print coat layer that includes the ink receptor. Applicant has discovered that reducing the amount of acrylic acid in the binder of the print coat improves the melt flow of the image into the article, e.g., a fabric. This increases the washability of the fabric such that the image transferred to the fabric remains more robust and vivid after multiple washings of the fabric, particularly for light colored fabrics.

In embodiments, the first layer or tie coat comprises at least about 20% acrylic acid by weight of the EAA copolymer. Since the tie coat is typically positioned at the outer surface of the image after it has been transferred to the article, this layer receives the substantial portion of the abrasion and fabric roughening that occurs during washing and drying cycles as the fabric swells and contracts. Maintaining a higher level of acid in the tie coat reduces the abrasion wear and increases retention of the ink color in the article.

In embodiments, the second or print coat layer comprises a first EAA material comprising about 20% acrylic acid and a second EAA material comprising less than 20% acrylic acid, preferably about 15%. The first and second materials may have a ratio of weight of about 90/10 to about 50/50, preferably about 80/20 to about 70/30. In an exemplary embodiment, the second material is about 25% by weight of the second component. This decreases the overall acid content of the print coat layer sufficiently to improve the melt flow of the image without substantially increasing abrasion and fabric roughening during washing and drying of the fabric.

In embodiments, the transfer sheet further comprises a third layer or base coat that is either disposed between the print coat and the tie coat and or mixed with the print coat to form one layer comprising both a print coat and a base coat. The third layer may be mixed with either or both of the first and second layers or they may be formed as separately layers that are placed in contact with, or bonded to, each other.

In certain embodiments, the white base coat layer comprises a first material comprising about 20% acrylic acid and a second material comprising less than 20% acrylic acid, preferably about 15%. The first and second materials may have a ratio of weight of about 90/10 to about 50/50, preferably about 80/20 to about 70/30. In an exemplary embodiment, the second material is about 25% by weight of the second component.

In embodiments, the transfer sheet further includes a release layer between the support layer and the image transfer layer. The release layer may comprise any suitable material that allows for removably attaching the release layer to the support layer. The release layer can function as a hot, warm, or cold peel.

In embodiments, the support layer comprises a backing paper. Suitable backing papers include nonwoven webs, synthetic polymers sheets, metalized films, woven and knitted textile sheets made of natural or synthetic fibers and combinations thereof, or laminates of two or more materials from the foregoing categories. In one embodiment, the backing paper comprises some percentage of post-consumer fibers. The backing paper may be opaque, translucent, or transparent. The thickness of the backing layer may be in the range of about 1 mil to about 10 mil, in particular, from 2 mil to about 6 mil. This thickness is desirable so that it allows sufficient heat to pass through backing paper during transfer of the image.

The transfer sheet may be used to transfer an image onto an article by contacting the support layer or backing paper to the article and applying heat and pressure to transfer the ink composition, thereby rendering the image onto the article. The substrate or article may comprise any suitable white or light article in which it is desired to print an image. In certain embodiments, the article comprises a white or light colored textile. The textile may comprise 100% cotton, less than 100% cotton or cotton/polyester blends.

In another aspect, a transfer sheet for transferring an image onto an article comprises a support layer and an image transfer layer overlying the support layer. The image transfer layer comprises a first layer comprising a binder and a second layer comprising an ink receptor. The image transfer layer further includes a release layer between the support layer and the image transfer layer. The release layer comprises a crosslinking agent and is configured to be attached to the support layer, which may comprise any suitable backing paper, prior to the transfer of the image to the substrate or article.

Detaching the backing paper from the transfer sheet prior to transfer of the image to the article can accelerate and enhance the transfer of heat to the image transfer layer and the article when parchment paper is used to cover the transfer sheet instead of the backing paper. This results in a deeper penetration of the ink into the article, thereby improving the brightness, clarity and colorfulness of the image. In addition, the deeper penetration of ink improves the overall durability and washability of the image on the article.

In embodiments, the support layer is configured to be detached from the image layer with a peel force of less than about 30 N/25 mm, preferably between about 10 N/25 mm and about 20 N/25 mm. This reduced peel force minimizes splitting and disruption of the image after it has been transferred to the fabric.

In embodiments, the first layer comprises a tie coat or film forming layer that comprises an EAA copolymer. Typically, combining a film forming layer with a release layer increases cracking and reduces washability of the article after the image has been transferred thereon. Applicant has discovered, however, that combining the film forming layer with a release layer having a crosslinking agent provides increase penetration of the image into the fabric, thereby improving washability and durability of the article, particularly when the image transfer layer has been detached from the support layer prior to transfer of the image to the article, allowing the use of thin parchment paper instead of the relatively thick backing paper for the transfer process.

The crosslinking agent may comprise any suitable agent, such as epoxy resins and isocyanate. In one embodiment, the crosslinking agent comprises a polyfunctional aziridine.

In embodiments, the release layer is substantially cured before it is applied to, or mixed with, the image transfer layer. This facilitates detachment of the image transfer layer from the release layer. In particular, this reduces the peel force required to detach the support layer, which minimizes splitting and disruption of the image transfer layer when it is transferred to the article.

In embodiments, a degree of curing of the release layer is at least about 80% before applying the release layer to the first layer, preferably at least about 90%. In a preferred embodiment, the release layer is cured in less than about 10 minutes, preferably less than about four minutes. This also facilitates detachment of the image transfer layer from the support layer.

In embodiments, the release layer has a weight of less than about 3 pounds/1300 ft2, preferably about 1 pound/1300 ft2 to about 1.5 pounds/1300 ft2. Providing a lightweight release layer further reduces the peel force required to detach the image transfer layer and/or the release layer from the support layer.

In embodiments, the transfer sheet comprises a protective layer configured to overly the image transfer layer on an opposite side of the backing paper, preferably after the backing paper has been detached from the image transfer layer. In embodiments, the protective layer has a thickness of less than about 2.5 mils. Suitable materials for the protective layer include silicone release and parchment paper. In a preferred embodiment, the protective layer comprises parchment paper or the like.

In another aspect, a transfer sheet for transferring an image onto a substrate is provided that is produced by a novel process. The process comprises providing a backing paper and an image transfer layer including an ink receptor attached to the backing paper and detaching the image transfer layer from the backing paper. Then instead of using the backing paper to cover the image layer for the heat transfer step, material such as parchment paper can be used.

In embodiments, a protective layer is positioned over the image transfer layer on an opposite side as the backing layer (after the backing layer has been removed). The image transfer layer is then positioned on the article and heat and pressure are applied to transfer the image to the article. This process accelerates and enhances the heat transfer, which increases penetration of the ink from the image transfer layer into the article, thereby providing a softer feeling transfer that improves washability and durability. This process is particularly useful for low pressure heat press and/or iron transfers of the image transfer layer to the article.

In addition, this process reduces the overall peel force required to remove the image transfer layer from the original backing layer, which reduces splitting and disruption of the coatings as they are transferred to the article. The image layer is removed cleanly at room temp and pressure instead of after being under high temp and pressure. Then a nonstick material is used as the protective layer for the heat transfer step. This results in an improved appearance of the image on the article compared to the standard method.

In embodiments, the protective layer has a thickness of less than about 2.5 mils. Suitable materials for the second support layer include parchment and silicone release paper. In a preferred embodiment, the second support layer comprises parchment paper or the like.

In embodiments, the original backing layer is peeled away from the image transfer layer, preferably with a peel force of less than about 30 N/25 mm, preferably between about 10 N/25 mm and about 20 N/25 mm.

In embodiments, the temperature and pressure applied to the image transfer layer with this process is less than conventional transfer sheets. In one such embodiment, the temperature of the heat applied to the image transfer layer is about 360° F. to about 375° F. The pressure is preferably about 30 psi to about 45 psi.

In embodiments, the process further comprises applying a release layer between the backing paper and the image transfer layer and detaching the image transfer layer from the release layer. In a preferred embodiment, the release layer comprises a crosslinking agent.

In embodiments, the image transfer layer comprises a binder having first and second components each comprising an EAA copolymer, wherein the second component comprises less than about 20% acrylic acid by weight of the EAA copolymer, preferably about 15% by weight.

In another aspect, a transfer assembly, system or kit is provided for transferring an image onto a substrate. The transfer assembly comprises a protective layer having a thickness of less than about 2.5 mils, an image transfer layer comprising an ink receptor and a release layer adhered to the image transfer layer.

In embodiments, the protective layer comprises a parchment paper. The parchment paper may be applied to an opposite side of the image transfer layer from the article.

In embodiments, the transfer assembly further comprises a backing paper removably adhered to the image transfer layer. The backing paper is preferably removed from the image transfer layer with a peel force of less than about 30 N/25 mm, preferably between about 10 N/25 mm and about 20 N/25 mm In embodiments, the image transfer layer comprises a first layer and a second layer, the second layer comprising an ink receptor, wherein the second layer comprises a binder having first and second components each comprising an EAA copolymer. the second component comprises less than about 20% acrylic acid by weight of the EAA copolymer, preferably about 15% by weight.

In embodiments, the image transfer layer further comprises a release layer. The release layer comprises a crosslinking agent.

In embodiments, the substrate comprises a light colored or white textile, such as cotton or cotton/polyester blends.

In embodiments, the ink composition comprises a colorant and an aqueous liquid carrier. The compositions are not limited to a particular type of colorant and include, organic and inorganic pigments, dyes, or macromolecular coloring agents, such as poly(oxyalkylene), substituted chromophores and polymers incorporating such compounds, such as polyurethanes and polyesters. By way of further example, the colorant may be selected from sublimation dyes, disperse dyes, reactive dyes, acid dyes, and basic dyes, as well as titanium dioxide, carbon black, and calcium carbonate.

The ink composition may be printed on the upper surface of the transfer sheet by any of a variety of conventional techniques. By way of example, the ink composition may be applied by inkjet printing, screen printing, lithographic printing, stamping, gravure printing or the ink composition may be applied by manually. In an exemplary embodiment, the ink composition is applied by inkjet printing.

In embodiments, the ink receptor comprises a hydrophilic organic material that attaches to ink molecules. Suitable materials for the ink receptor include, but are not limited to, poly(acrylic acid), poly(vinyl imidazole), poly(2-hydroxyethyl methacrylate), poly(vinyl pyrrolidone), poly(Vinyl) poly(pyrrolidone), and polyvinyl acetate, cationic polymers and their salts, hygroscopic inorganic salts, silica and zeolites.

The recitation of desirable objects which are met by various embodiments herein is not meant to imply or suggest that any or all of these objects are present as essential features, either individually or collectively, in the most general embodiment of the present description or any of its more specific embodiments.

DETAILED DESCRIPTION OF THE EMBODIMENTS

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting.

Various embodiments provide systems and methods for transferring images to articles, such as textiles, fabric or the like. In addition, improved methods for manufacturing transfer assemblies and sheets are shown in various embodiments. Such systems and methods are particularly useful for transferring images to white or colored fabrics, such as T-shirts, hats, sweatshirts and the like.

Figure 1:
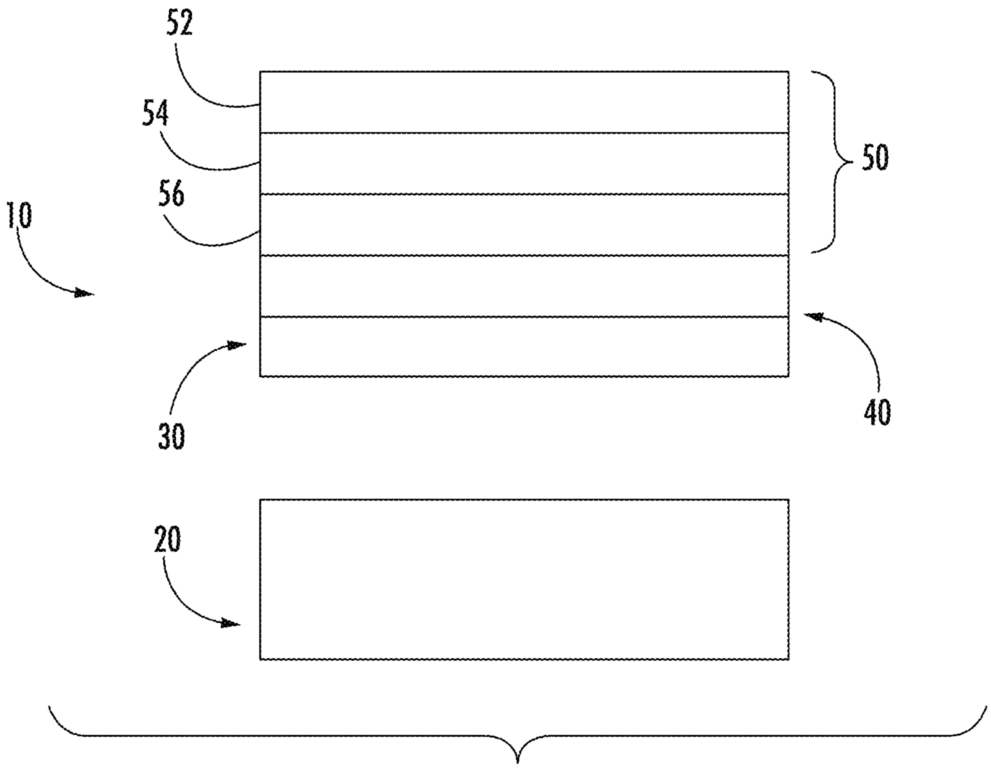
FIG. 1 illustrates a transfer sheet for transferring an image onto a substrate or article.

FIG. 1 illustrates one embodiment of a transfer sheet 10 for transferring an image to an article 20. Transfer sheet 10 comprises a support layer or base sheet 30, a release layer 40 and an image transfer layer 50 that includes at least a binder, an ink receptor and, in some embodiments, a blocking agent. An ink composition or printed coating containing the image is applied to the upper surface of image transfer layer 50. The ink composition may include printed areas and non-printed areas.

In some embodiments, heat and pressure are applied to transfer sheet 10 to transfer the ink composition or printed coating from image transfer sheet 50 to article 20. In other embodiments, base sheet 30 is removed from image transfer sheet 50 prior to applying heat and pressure (discussed in more detail below).

The ink composition may be printed on the upper surface of the transfer sheet by any of a variety of conventional techniques. By way of example, the ink composition may be applied by inkjet printing, screen printing, lithographic printing, stamping, gravure printing or the ink composition may be applied by manually. The formulation of the ink composition may be adjusted to be compatible with the printing method selected. The ink composition may range in consistency from a liquid to a paste.

The ink composition may contain additional components, as known to those skilled in the art, such as binders, humectants, surfactants and the like. The aqueous carrier liquid may, in addition to water, incorporate minor amounts of organic co-solvents that are water miscible, such as lower alcohols, glycols and glycerin. By way of example, the organic co-solvents may comprise 20 weight % or less of the liquid carrier component of the ink composition.

In an exemplary embodiment, the ink composition is a pigment ink applied by inkjet printing in a one-step process.

The substrate or article may comprise any suitable article in which it is desired to print an image. Suitable articles include T-shirts-, sweatshirts, hats, leather goods, signs, laminates, metal, glass, wood, paper or other cellulosic material and the like. The article may be a woven, knitted or non-woven textile material consisting of natural or synthetic fibers, or combinations thereof. By way of example, the textile may comprise fibers selected from cotton, wool, jute, hemp, polyester, polyamide, polyurethane and polyolefin.

The article may comprise a white or light colored textile. The textile may comprise 100% cotton, less than 100% cotton or cotton/polyester blends.

In this embodiment, image transfer layer 50 comprises three layers: (1) a print coat layer 52 that includes the ink receptor and, in some embodiments, a blocking agent; (2) a base coat 54; and (3) a tie coat layer 56 that contains the binder. The three layers may be formed separately and applied to each other such that tie coat layer 56 is disposed between the other two layers and release layer 40. Alternatively, one or more of the layers may be mixed together.

Figure 2:
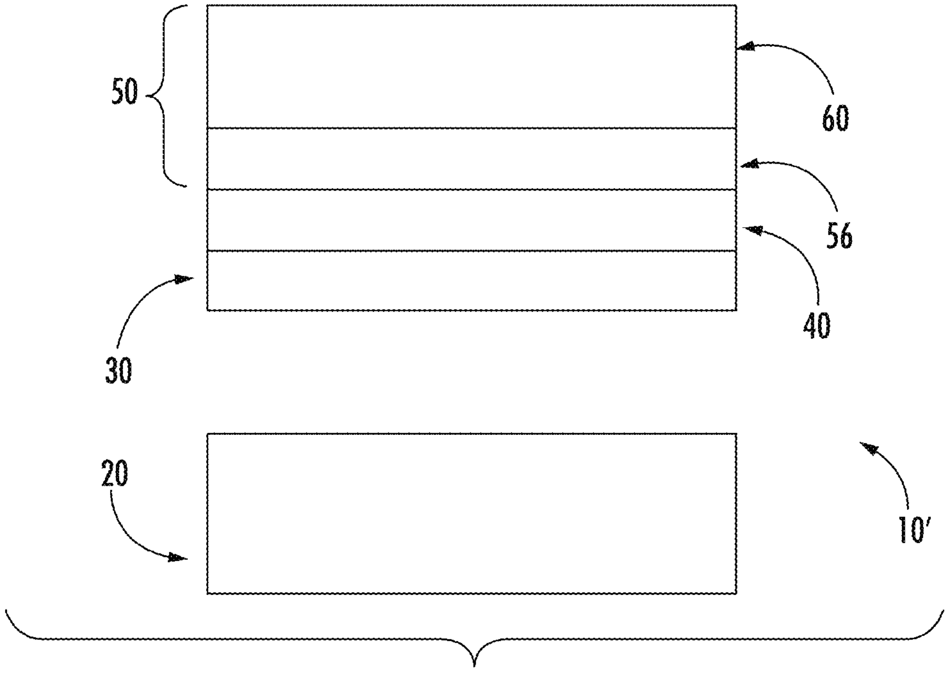
FIG. 2 shows another embodiment of a transfer sheet for transferring an image onto a substrate or article.
Figure 3:
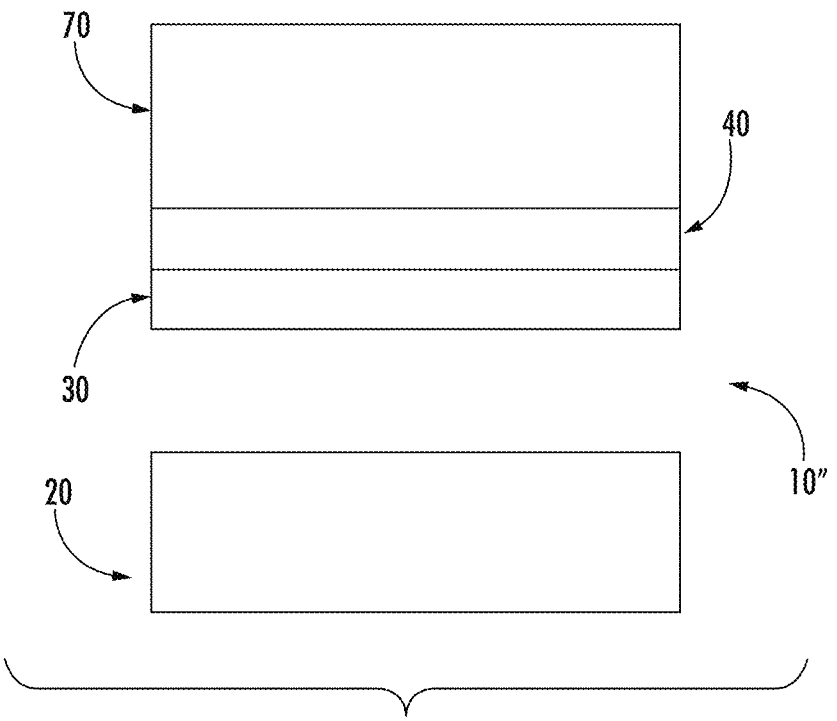
FIG. 3 shows another embodiment of a transfer sheet for transferring an image onto a substrate or article.

FIG. 2 illustrates an alternative embodiment of a transfer sheet 10' wherein the print coat layer and the base coat layer are mixed together to form a single layer 60 and applied to tie coat layer 56. FIG. 3 illustrate yet another embodiment of a transfer sheet 10" wherein the materials that form all three of these layers (i.e., print coat layer 52, base coat layer 54 and tie coat layer 56) are mixed together to form a single layer 70 and applied to release layer 40. In yet another embodiment, the blocking agent and the ink receptors may be formed in separate layers. These separate layers may, or may not, include the binder or the base layer.

Print coat layer 52 includes the ink receptor. The ink receptor is preferably hydrophilic and is capable of absorbing the aqueous liquid carrier component of the ink composition used to print an image on the transfer assembly. In particular, the aqueous ink composition is printed on the upper surface of the image transfer layer, and the aqueous component of the ink is absorbed through into the image transfer layer. As the aqueous liquid carrier is drawn through the image transfer layer, the blocking agent is disrupted.

Depending on the nature of the ink composition, the colorants present in the ink composition may be absorbed by the ink receptor along with the liquid carrier, or the colorant will remain concentrated on the upper surface of the transfer sheet. For example, dyes that are soluble in the aqueous liquid carrier may be readily absorbed into the image transfer layer, whereas pigments, disperse dyes and macromolecular colorants are less mobile and penetrate less deeply into the image transfer.

By way of example, suitable ink receptors may be selected from hydrophilic polymers, including poly(acrylic acid), poly(vinyl imidazole), poly(2-hydroxyethyl methacrylate), poly(vinyl pyrrolidone), poly(vinyl)poly(pyrrolidone), and polyvinyl acetate, cationic polymers and their salts. Such as polydiallyldimethylammonium chloride, polyacrylamides, and poly(epichlorohydrin-dimethylamine); hygroscopic inorganic salts, including calcium nitrate and sodium chloride; silica; Zeolites; and other hydrophilic compounds used as flocculants, coagulants, and desiccants.

The ink receptor may be present in print coat layer in an amount of about 2% to about 25% by weight, or about 5% to about 15% or about 10%. In one embodiment, the ink receptor comprises a crosslinked homopolymer of N-vinyl-2-pyrrolidone, such as Polyplasdone™ INF-10, manufactured by Ashland™).

Print coat layer 52 further comprises a binder having first and second components each comprising an ethylene acrylic acid (EAA) copolymer. The second component comprises less than about 20% acrylic acid by weight of the EAA copolymer. Applicant has discovered that reducing the amount of acid in the binder of the print coat improves the melt flow of the image into the article, e.g., a fabric. This increases the washability of the fabric such that the image transferred to the fabric remains more robust and vivid after multiple washings of the fabric, particularly for light colored fabrics.

In embodiments, print coat layer 52 comprises a first material comprising about 20% acrylic acid and a second material comprising less than 20% acrylic acid, preferably about 15%. The first and second materials may have a ratio of weight of about 90/10 to about 50/50, preferably about 80/20 to about 70/30. In an exemplary embodiment, the second material is about 25% by weight of the second material. This decreases the overall acid content of the print coat layer sufficiently to improve the melt flow of the image without substantially increasing abrasion and fabric roughening during washing and drying of the fabric.

In an exemplary embodiment, the first material comprises an ethylene acrylic acid dispersion in about 10% to about 40% by weight of the print coat layer, and the second material comprises about 2% to about 15% by weight of the print coat layer.

Print coat layer 52 may include materials other than the ink receptor. For example, print coat layer 52 may include certain silicas, surfactants, waxes and/or thickeners. Suitable surfactants include, but are not limited to, nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS), and the like. Examples of waxes include, but are not limited to, polyolefins, polyethylenes, functionalized waxes, such as amines, amides, fluorinated waxes, mixed fluorinated and amide waxes, such as esters, quaternary amines, carboxylic acids or acrylic polymer emulsion, chlorinated polyethylenes, natural or synthetic ester waxes, carnauba wax, paraffin, and the like. Such waxes can optionally be fractionated or distilled to provide specific cuts that meet certain viscosity and/or temperature criteria. Suitable thickeners include, but are not limited to, starches, gums, pectin, paragum and the like.

In an exemplary embodiment, print coat layer 52 may include a plasticizer, a wax and/or an ethylene oxide homopolymer. In an exemplary embodiment, print coat layer 52 comprises a plasticizer in about 15% to about 40% by weight, a wax composite in about 15% to about 40% by weight and an ethylene oxide homopolymer in about 2% to about 15% by weight.

In certain embodiments, the base coat layer 54 comprises a first material comprising about 20% acrylic acid and a second material comprising less than 20% acrylic acid, preferably about 15%. The first and second materials may have a ratio of weight of about 90/10 to about 50/50, preferably about 80/20 to about 70/30. In an exemplary embodiment, the second material is about 25% by weight of the second component.

In an exemplary embodiment, base coat layer 54 comprises an ethylene acrylic acid dispersion in about 25% to about 50% by weight of the print coat layer, and the second material comprises an ethylene acrylic acid dispersion in about 2% to 10% by weight of the print coat layer.

Print coat layer 52 may include other materials such as certain silicas, surfactants, waxes and/or thickeners. Suitable surfactants include, but are not limited to, nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS), and the like. Examples of waxes include, but are not limited to, polyolefins, polyethylenes, functionalized waxes, such as amines, amides, fluorinated waxes, mixed fluorinated and amide waxes, such as esters, quaternary amines, carboxylic acids or acrylic polymer emulsion, chlorinated polyethylenes, natural or synthetic ester waxes, carnauba wax, paraffin, and the like.

Tie coat layer 56 includes a binder, which preferably comprises a material that facilitates bonding between print coat layer 52 and base coat layer 54 with release layer 40. The binder preferably comprises a material that does not swell when it comes into contact with water, i.e., it absorbs water (>5% and <50% of its own weight). The binder is preferably hydrophobic.

The binder may be a wax, thermoplastic polymer, or pre polymer, or combinations thereof. Additional reactive compounds may be employed in the binder composition, including cross-linking agents, monomers and oligomers, which are capable of combining with themselves or other components in the binder composition. Constituents of the binder composition may be self-crosslinking or capable of bonding to functional groups present in the article being printed, to improve washfastness. The ink compositions useful for the transfer sheets include a colorant and an aqueous liquid carrier. The compositions are not limited to a particular type of colorant and include, organic and inorganic pigments, dyes, or macromolecular coloring agents, such as poly (oxyalkylene) Substituted chromophores and polymers incorporating such compounds, such as polyurethanes and polyesters. By way of further example, the colorant may be selected from sublimation dyes, disperse dyes, reactive dyes, acid dyes, and basic dyes, as well as titanium dioxide, carbon black, and calcium carbonate.

In certain embodiments, tie coat layer 56 comprises an EAA copolymer containing at least about 20% acrylic acid dispersion of the copolymer. Since the tie coat is typically positioned at the outer surface of the image after it has been transferred to the article, this layer receives the substantial portion of the abrasion and fabric roughening that occurs during washing and drying cycles as the fabric swells and contracts. Maintaining a higher level of acid in the tie coat reduces the abrasion wear and increases retention of the ink color in the article.

In an exemplary embodiment, tie coat layer 56 comprises an EAA dispersion in an amount of about 80% to about 99% by weight. Tie coat layer 56 may include other components, such as surfactants, crosslinkers, urethanes, polyesters and the like. In one such embodiment, tic coat layer 56 comprises a silicone glycol copolymer and an aqueous surfactant.

Release layer 40 allows image transfer layer 50 to be separated from base sheet 30 before or after the print coating has been applied to article 20. Release layer 40 may comprise any suitable material that allows for removably attaching release layer 40 to base sheet 30. Suitable materials for release layer 40 include hot peels, cold peel, hot split and the like.

In an exemplary embodiment, release layer 40 is a hot peel comprising an acrylic polymer emulsion in an aqueous dispersion. The acrylic polymer emulsion may be present in at least about 50% of the base sheet, at least about 75% of the base sheet or at least about 90% of the base sheet.

In one exemplary embodiment, the release layer 40 may include a cross-linking agent in the binder. Applicant has discovered that combining the tie coat layer 56 described above with a release layer comprising a crosslinking agent provides increase penetration of the image into the fabric, thereby improving washability and durability of the article, particularly when the image transfer layer has been detached from the support layer prior to the application of heat and pressure.

Suitable cross-linking agents, include epoxy resins, isocyanate or polyfunctional aziridines. In a preferred embodiment, the crosslinking agent comprise a polyfunctional aziridine in an amount of about 2% to about 10% by weight.

In embodiments, the release layer is substantially cured before the image transfer layer is applied over it. This facilitates detachment of the release layer from the support layer. In particular, this reduces the peel force required to detach the release layer from the support layer, which minimizes splitting and disruption of the image transfer layer when it is transferred to the article.

In embodiments, a degree of curing of the release layer is at least about 80% after applying the release layer to the first layer, preferably at least about 90%. The "degree of cure" is defined herein to mean the degree in which the composition has cross-linked sufficiently so that it is substantially in its final form (i.e., no further cross-linking and/or no further substantial changes will occur to the composition). The degree of cure as defined here does not necessarily mean that the composition is 100% cross-linked such it has become a fully cured resin, but rather 100% of the curing that will occur before the composition does not substantially change in function or appearance.

In a preferred embodiment, the release layer is cured in less than about ten minutes, preferably less than about four minutes. This also facilitates detachment of the image transfer layer from the support layer.

In embodiments, the release layer has a weight of less than about 3 pounds/1300 ft2, preferably about 1 pound/1300 ft2 to about 1.5 pounds/1300 ft2. Providing a lightweight release layer further reduces the peel force required to detach the image transfer layer and/or the release layer from the support layer.

In certain embodiments, release layer 40 may further include a surfactant and/or an acrylic emulsion. Suitable surfactants for use with the binding agents disclosed herein include nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS) and the like.

Base sheet or support layer 30 may any backing sheet selected from (i) nonwoven webs, including those made from cellulosic fibers, such as coated and uncoated paper, parchment paper, and paperboard, and those made from synthetic polymers, such as polyethylene, polypropylene, polystyrene and other polyolefins; (ii) synthetic polymers sheets, including thermoplastic polymers, such as polyester (e.g. PET and PEN), poly(vinyl chloride), polystyrene, polymethacrylate, polycarbonate, polyimide, polyurethanes, ethylene-vinyl acetate, and polytetrafluoroethylene, and thermosetting resins; (iii) metalized films, including metalized biaxially-oriented polyethylene terephthalate; (iv) woven and knitted textile sheets made of natural or synthetic fibers and combinations thereof, and (V) laminates of two or more materials from the foregoing categories, including a laminate of a nonwoven webs and a thermoplastic polymer.

The base sheet may be opaque, translucent, or transparent. In certain embodiments, the base sheet comprises some percentage of post-consumer fibers The thickness of the base sheet may be in the range of about 1 mil to about 10 mil, in particular, from 2 mil to about 6 mil. This thickness is desirable so that it allows sufficient heat to pass through base sheet during transfer of the image.

In one embodiment, release layer 40 is configured to be detached from the support layer 30 prior to the application of heat and pressure to the transfer sheet. Detaching the support layer 30 from the transfer sheet accelerates and enhances the transfer of heat to the image transfer layer and the article. This results in a deeper penetration of the ink into the article, thereby improving the brightness, clarity and colorfulness of the image. In addition, the deeper penetration of ink improves the overall durability and washability of the image on the article.

In embodiments, support layer 30 is configured to be detached from release layer 40 with a peel force of less than about 30 N/25 mm, preferably between about 10 N/25 mm and about 20 N/25 mm. This reduced peel force minimizes splitting and disruption of the image after it has been transferred to the fabric.

Figure 5:
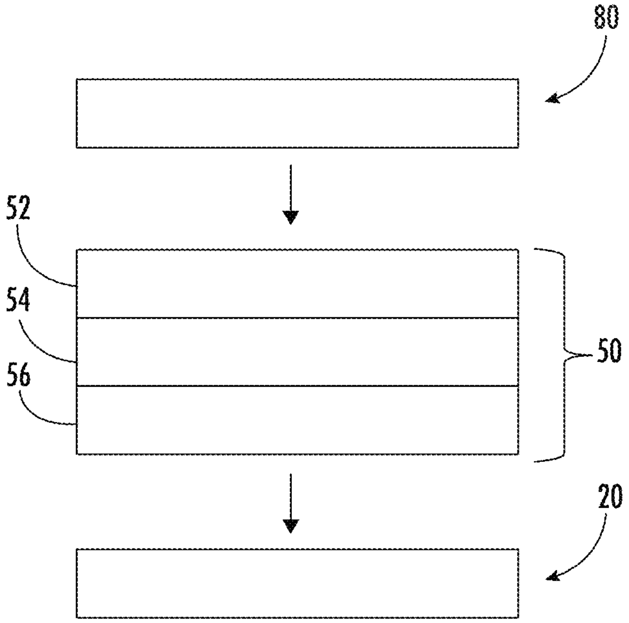
FIG. 5 schematically illustrates placement of a first surface of the image transfer layer onto an article and the placement of a protective layer on a second opposite surface of the image transfer layer.
Figure 6:
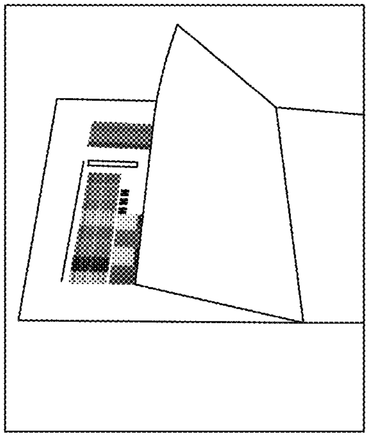
FIG. 6 illustrates a conventional transfer sheet with a conventional backing paper.

In embodiments, transfer sheet 10 includes a protective layer 80 (see FIG. 5). The protective layer 80 is positioned over the image transfer layer 50 on an opposite side as the backing layer (after the backing layer 30 has been removed). The image transfer layer 50 is then positioned on the article 20 and heat and pressure is applied to transfer the image to the article 20. This process accelerates and enhances the heat transfer, which increases penetration of the ink from the image transfer layer into the article, thereby providing a softer heat transfer that improves washability and durability. This process is particularly useful for low pressure heat press and/or iron transfers of the image transfer layer to the article.

In addition, this process reduces the overall peel force required to remove the image transfer layer from the original backing layer, which reduces splitting and disruption of the coatings as they are transferred to the article. This results in an improved appearance of the image on the article.

In embodiments, protective layer 80 60 has a thickness of less than about 2.5 mils. Suitable materials for the protective layer 80 include silicone release and parchment paper. In a preferred embodiment, the protective layer comprises parchment paper or the like.

In embodiments, the temperature and pressure applied to the image transfer layer with this process is less than conventional transfer sheets. In one such embodiment, the temperature of the heat applied to the image transfer layer is about 360° F. to about 375° F. The pressure is preferably about 30 psi to about 45 psi.

Figure 4:
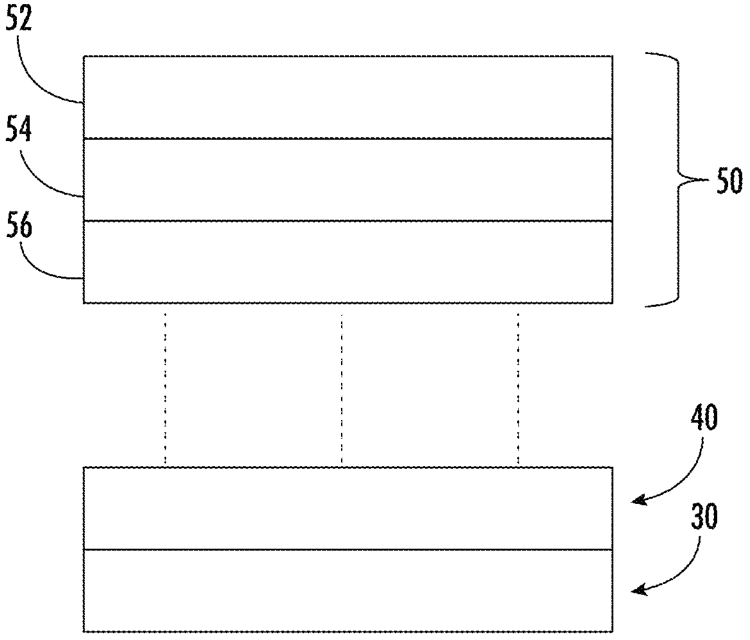
FIG. 4 schematically illustrates the removal of an image transfer layer from a release layer and a backing layer of the transfer sheet.

FIGS. 4 and 5 illustrate a novel process for manufacturing the transfer sheets described above. Release layer 40 is applied to base layer 30 and image transfer layer 50 is then applied to, or placed in contact with, release layer 40.

Figure 7:
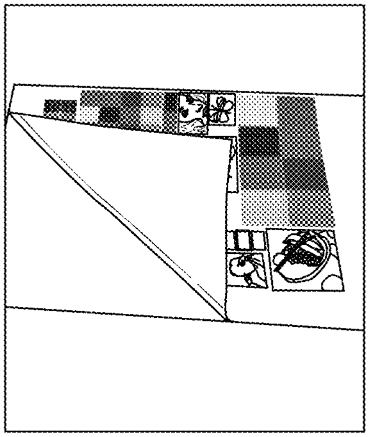
FIG. 7 illustrates a transfer sheet being peeled away from a conventional backing paper.

In a conventional process, the image transfer layer 50 would then be heated and pressed by a heat press, iron, or other suitable machine, to apply the image to the upper surface of image transfer layer 50 with a suitable ink composition or print coating, as discussed above. In one embodiment, described herein, however, the image transfer layer 50 is detached from the release layer 40 and the base layer 30 prior to this heating and pressing process (see FIG. 4). In an exemplary embodiment, image transfer layer 50 is peeled away from the release layer 40 at room temperature and with minimal pressure. For example, the removal process may be started at one corner of image transfer layer 50 (see FIG. 7).

Figure 8:
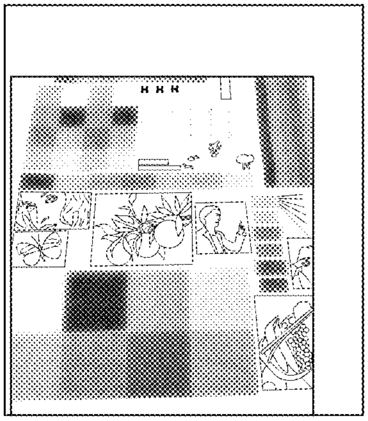
FIG. 8 illustrates the transfer sheet being applied to an article with a parchment paper overlying the transfer sheet.

After image transfer layer 50 has been completely removed from release layer 40, it is placed face down onto an article 20 (see FIG. 5) and a protective layer 80 (such as a parchment paper) is placed on the opposite surface of image transfer layer 50 (see also FIG. 8). The parchment paper is much thinner than the original backing paper, as discussed above.

At this point, the ink within image transfer layer 50 may be transferred to article 20 to transfer the image to the article. This may be accomplished, for example, with a heat press of high temperature and moderate pressure for about 30 seconds, or with a standard iron for about 3 minutes.

In an exemplary embodiment, the heat and pressure may be applied to the article and the transfer sheet for a time period of about 25 to 30 seconds. At the end of the transfer time, the transfer sheet is peeled away from the article, with the printed areas of the image transfer layer remaining bound to the article and, in some embodiments, the non-printed areas of the image transfer layer remaining bound to the support layer of the transfer sheet.

EXAMPLES

Applicant conducted testing of conventional transfer sheets and the transfer sheets discussed herein. In particular, Applicant conducted side by side comparisons of articles that had images transferred with the conventional method (i.e., a backing paper) and the process in accordance with certain embodiments described herein (wherein the backing paper is removed and replaced with a parchment paper on the opposite side of the image transfer layer).

Figure 9:
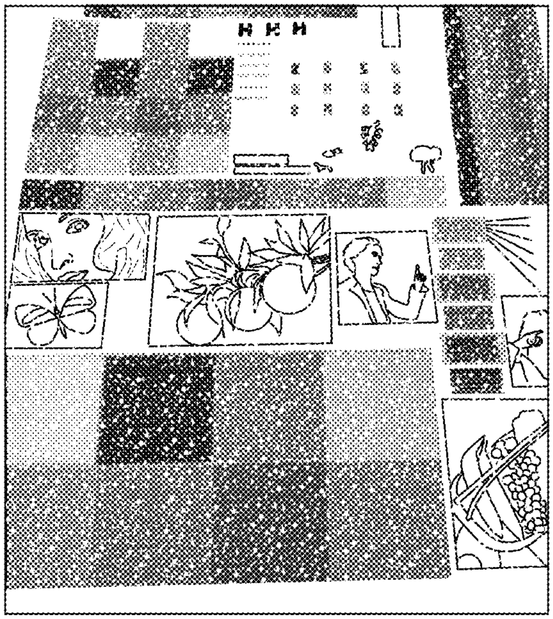
FIG. 9 illustrates the result after 10 wash and dry cycles of a conventional transfer sheet after transferring the image to an article with a heat press.

FIG. 9 is a black and white drawing of a color photo that illustrates an article with an image transferred thereon in the conventional process with a backing sheet. The image was transferred with a heat press at a relatively low pressure. After the transfer, the article was subjected to 10 wash and dry cycles. As shown, the image in the article has started to crack in multiple locations. In addition, the image has already started to fade and has lost some of its luster and brightness.

Figure 10:
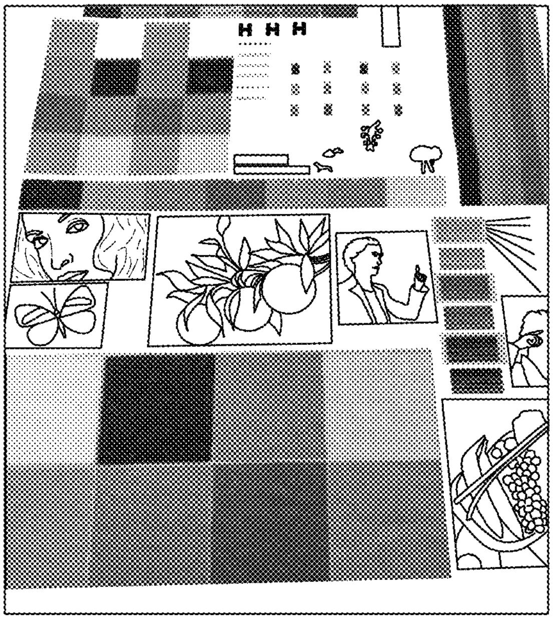
FIG. 10 illustrates the results after 10 wash and dry cycles after transferring the image to an article with a heat press using the new method.

FIG. 10 is a black and white drawing of a color photo that illustrates an article having an image transferred thereto with the processes in accordance with certain embodiments described herein (i.e., face down parchment). The image was transferred with a heat press at a relatively low pressure. After the transfer, the article was subjected to 10 wash and dry cycles. As shown, the image has not started to crack. In addition, the image is brighter and more vivid than the image shown in FIG. 9. This illustrates that the transfer sheets and processes in accordance with certain embodiments described herein produce an image with increased durability and washability than conventional transfer sheets and processes.

Figure 11:
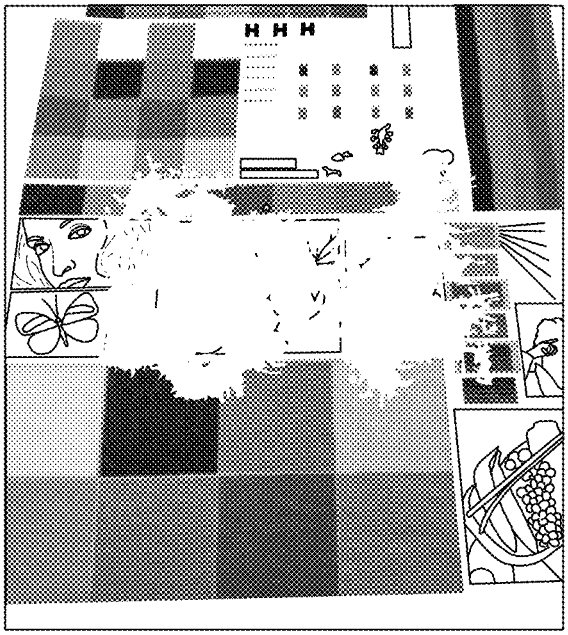
FIG. 11 illustrates the result after 10 wash and dry cycles of a conventional transfer sheet after transferring the image to an article with an iron.

FIG. 11 is a black and white drawing of a color photo that illustrates an article with an image transferred thereon in the conventional process with a backing sheet. The image was transferred with an iron for about 3 minutes. After the transfer, the article was subjected to 10 wash and dry cycles. As shown, large defects have already formed in the image.

Figure 12:
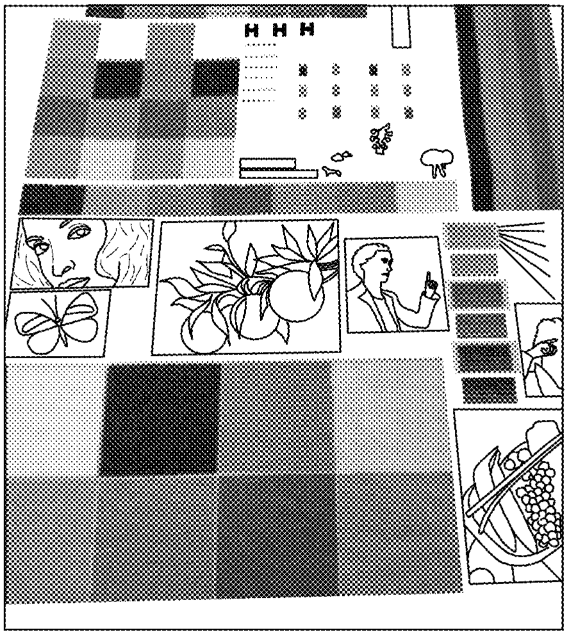
FIG. 12 illustrates the results after 10 wash and dry cycles after transferring the image to an article with an iron using the new method.

FIG. 12 is a black and white drawing of a color photo that illustrates an article having an image transferred thereto with the processes in accordance with certain embodiments described herein (i.e., face down parchment). The image was transferred with an iron for about 3 minutes. After the transfer, the article was subjected to 10 wash and dry cycles. As shown, the image does not contain any large defects and is brighter and more vivid than the image shown in FIG. 11. This illustrates that the transfer sheets and processes in accordance with certain embodiments described herein produce an image with increased durability and washability than conventional transfer sheets and processes even when the image is transferred to the article with an iron rather than a heat press.

While the devices, systems and methods have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

For example, in a first aspect, a first embodiment is a transfer sheet for transferring an image onto a substrate. The transfer sheet comprises a support layer and an image transfer layer overlying the support layer. The image transfer layer comprises a first layer including a binder and a second layer comprising an ink receptor. The second layer comprises first and second components each comprising an ethylene acrylic acid (EAA) copolymer. The second component comprises less than about 20% acrylic acid by weight of the EAA copolymer. The transfer sheet further comprises a release layer between the support layer and the first layer.

A second embodiment is the first embodiment, wherein the second component comprises about 15% acrylic acid by weight of the EAA copolymer.

A $3^{rd}$ embodiment is any combination of the first 2 embodiments, wherein the first component comprises about 20% acrylic acid by weight of the EAA copolymer.

A $4^{th}$ embodiment is any combination of the first 3 embodiments, wherein the second layer comprises the first and second components in ratio of about 90/10 to about 50/50.

A $5^{th}$ embodiment is any combination of the first 4 embodiments, wherein the ratio is about 80/20 to about 70/30.

A $6^{th}$ embodiment is any combination of the first 5 embodiments, wherein the first layer is a tie coat layer comprising a binder having an EAA copolymer of at least about 20% by weight of the binder.

A $7^{th}$ embodiment is any combination of the first 6 embodiments, wherein the second layer comprises a print-coat layer and a basecoat layer.

An $8^{th}$ embodiment is any combination of the first 7 embodiments, wherein the first layer and the second layer are mixed together.

A $9^{th}$ embodiment is any combination of the first 8 embodiments, wherein the support layer comprises a backing paper comprising post-consumer fibers.

A $10^{th}$ embodiment is any combination of the first 9 embodiments, wherein the release layer comprises a crosslinking agent.

An $11^{th}$ embodiment is any combination of the first 10 embodiments, wherein the crosslinking agent comprises a polyfunctional aziridine.

In another aspect, a first embodiment is a transfer sheet for transferring an image onto a substrate. The transfer sheet comprises a support layer and an image transfer layer overlying the support layer. The image transfer layer comprises a first layer and a second layer, the second layer comprising an ink receptor, wherein the first layer comprises a binder and a release layer between the support layer and the first layer, wherein the release layer comprises a crosslinking agent.

A second embodiment is the first embodiment, wherein the crosslinking agent comprises a polyfunctional aziridine.

A third embodiment is any combination of the first 2 embodiments, wherein the binder comprises an EAA copolymer.

A 4$^{th}$ embodiment is any combination of the first 3 embodiments, wherein the second layer comprises a printcoat layer and a basecoat layer, wherein the basecoat layer comprises one or more materials that increase an opacity of the printcoat layer.

A 5$^{th}$ embodiment is any combination of the first 4 embodiments, wherein the first and second layers are mixed together.

A 6$^{th}$ embodiment is any combination of the first 5 embodiments, wherein the release layer is cured prior to applying the image transfer layer to the release layer.

A 7$^{th}$ embodiment is any combination of the first 6 embodiments, wherein a degree of curing of the release layer is at least 80% before applying the release layer to the first layer.

An 8$^{th}$ embodiment is any combination of the first 7 embodiments, wherein the degree of curing is at least 90%.

A 9$^{th}$ embodiment is any combination of the first 8 embodiments, wherein the release layer is less than about 3 pounds/1300 ft2.

A 10$^{th}$ embodiment is any combination of the first 9 embodiments, wherein the release layer is about 1 pound/1300 ft2 to about 1.5 pounds/1300 ft2.

An 11$^{th}$ embodiment is any combination of the first 10 embodiments, wherein the release layer is cured in less than four minutes.

A 12$^{th}$ embodiment is any combination of the first 11 embodiments, wherein the support layer comprises a backing including post-consumer fiber.

A 13$^{th}$ embodiment is any combination of the first 12 embodiments, wherein the backing paper is configured to be detached from the image transfer layer with a peel force of less than about 20 N/25 mm.

A 14$^{th}$ embodiment is any combination of the first 13 embodiments, further comprising a protective layer is configured to be applied to a surface of the second layer.

A 15$^{th}$ embodiment is any combination of the first 14 embodiments, wherein the protective layer is a parchment paper.

A 16$^{th}$ embodiment is any combination of the first 15 embodiments, wherein the protective layer has a thickness of less than about 2.5 mils.

A 17$^{th}$ embodiment is any combination of the first 16 embodiments, wherein the image transfer layer comprises a first layer and a second layer, the second layer comprising an ink receptor, wherein the second layer comprises first and second components each comprising an EAA copolymer, wherein the second component comprises less than about 20% acrylic acid by weight of the EAA copolymer In another aspect, a first embodiment is a transfer sheet for transferring an image onto a substrate produced by a process. The process comprises providing a backing paper and an image transfer layer attached to the backing paper, the image transfer layer comprising an ink receptor; detaching the image transfer layer from the backing paper; and applying heat and pressure to the image transfer layer after the backing paper has been removed from the image transfer layer.

A second embodiment is the first embodiment, wherein the image transfer layer is peeled away from the backing paper.

A 3$^{rd}$ embodiment is any combination of the first two embodiments, wherein a peel force required to peel away the image transfer layer from the backing paper is less than about 20 N/25 mm.

A 4$^{th}$ embodiment is any combination of the first 3 embodiments, wherein a temperature of the heat applied to the image transfer layer is about 360° F. to about 375° F.

A 5$^{th}$ embodiment is any combination of the first 4 embodiments, wherein the pressure is about 30 psi to about 45 psi.

A 6$^{th}$ embodiment is any combination of the first 5 embodiments, further comprising positioning the image transfer layer on the substrate.

A 7$^{th}$ embodiment is any combination of the first 6 embodiments, further comprising positioning a protective layer onto the image transfer layer.

An 8$^{th}$ embodiment is any combination of the first 7 embodiments, wherein the protective layer has a thickness of less than 2.5 mils.

A 9$^{th}$ embodiment is any combination of the first 8 embodiments, wherein the protective layer is a parchment paper.

A 10$^{th}$ embodiment is any combination of the first 9 embodiments, further comprising applying heat and pressure to the support layer and the image transfer layer to transfer the image to the substrate.

An 11$^{th}$ embodiment is any combination of the first 10 embodiments, further comprising applying a release layer between the backing paper and the image transfer layer and detaching the image transfer layer from the release layer.

A 12$^{th}$ embodiment is any combination of the first 11 embodiments, wherein the release layer comprises a crosslinking agent.

A 13$^{th}$ embodiment is any combination of the first 12 embodiments, wherein the crosslinking agent comprises a polyfunctional aziridine.

A 14$^{th}$ embodiment is any combination of the first 13 embodiments, further comprising applying an ink composition to the image transfer layer.

A 15$^{th}$ embodiment is any combination of the first 14 embodiments, wherein the image transfer layer comprises a binder having first and second components each comprising an EAA copolymer, wherein the second component comprises less than about 20% acrylic acid by weight of the EAA copolymer.

A 16$^{th}$ embodiment is any combination of the first 15 embodiments, wherein the acrylic acid in the second component is about 15% by weight of the EAA copolymer.

A 17$^{th}$ embodiment is any combination of the first 16 embodiments, wherein the first component comprises about 20% acrylic acid by weight of the EAA copolymer.

An 18$^{th}$ embodiment is any combination of the first 17 embodiments, wherein the substrate comprises a light colored textile.

A 19$^{th}$ embodiment is any combination of the first 18 embodiments, wherein the textile comprises cotton or cotton/polyester blends.

In another aspect, a first embodiment is a transfer assembly for transferring an image onto a substrate comprising a support layer having a thickness of less than about 2.5 mils, an image transfer layer comprising an ink receptor and a release layer adhered to the image transfer layer.

A second embodiment is the first embodiment, wherein the protective layer configured to removable attachment to the image transfer layer.

A third embodiment is any combination of the first two embodiments, wherein the protective layer is a parchment paper.

A 4th embodiment is any combination of the first 3 embodiments, further comprising a backing paper, wherein the release layer is removably adhered to the backing paper.

A 5th embodiment is any combination of the first 4 embodiments, wherein the image transfer layer comprises a first layer and a second layer, the second layer comprising an ink receptor, wherein the second layer comprises first and second components each comprising an EAA copolymer, wherein the second component comprises less than about 20% acrylic acid by weight of the EAA copolymer.

A 6th embodiment is any combination of the first 5 embodiments, wherein the release layer comprises a crosslinking agent.

A 7th embodiment is any combination of the first 6 embodiments, wherein the crosslinking agent comprises a polyfunctional aziridine.

What is claimed is:

1. A transfer sheet for transferring an image onto a substrate, the transfer sheet comprising:

a support layer;

an image transfer layer overlying the support layer, wherein the image transfer layer comprises a first layer including a binder and a second layer comprising an ink receptor, wherein the second layer comprises first and second components each comprising an ethylene acrylic acid (EAA) copolymer, wherein the second component comprises less than 20% acrylic acid by weight of the EAA copolymer; wherein the first component comprises 20% acrylic acid by weight of the EAA copolymer and a release layer between the support layer and the first layer.

2. The transfer sheet of claim 1, wherein the second component comprises about 15% acrylic acid by weight of the EAA copolymer.

3. The transfer sheet of claim 1, wherein the second layer comprises the first and second components in ratio of about 90/10 to about 50/50.

4. The transfer sheet of claim 1, wherein the second layer comprises a printcoat layer and a basecoat layer.

5. The transfer sheet of claim 1, wherein the support layer comprises a backing paper comprising post-consumer fibers.

6. The transfer sheet of claim 1, wherein the release layer comprises a crosslinking agent.

7. The transfer sheet of claim 6, wherein the crosslinking agent comprises a polyfunctional aziridine.

8. A transfer sheet for transferring an image onto a substrate, the transfer sheet comprising:

a support layer;

an image transfer layer overlying the support layer, wherein the image transfer layer comprises a first layer and a second layer, the second layer comprising an ink receptor, wherein the first layer comprises a binder, wherein the second layer comprises a printcoat layer and a basecoat layer, wherein the basecoat layer comprises one or more materials that increase an opacity of the printcoat layer; and a release layer between the support layer and the first layer, wherein the release layer comprises a crosslinking agent.

9. The transfer sheet of claim 8, wherein the crosslinking agent comprises a polyfunctional aziridine.

10. The transfer sheet of claim 8, wherein the binder comprises an EAA copolymer.

11. The transfer sheet of claim 8, wherein the release layer is cured prior to applying the image transfer layer to the release layer.

12. The transfer sheet of claim 11, wherein a degree of curing of the release layer is at least 80% before applying the release layer to the first layer.

13. The transfer sheet of claim 8, wherein the release layer is less than about 3 pounds/1300 $ft^2$.

14. The transfer sheet of claim 11, wherein the release layer is cured in less than four minutes.

15. The transfer sheet of claim 8, wherein the support layer comprises a backing paper including post-consumer fiber and wherein the backing paper is configured to be detached from the image transfer layer with a peel force of less than about 20 N/25 mm.

16. The transfer sheet of claim 8, further comprising a protective layer configured to be applied to a surface of the second layer.

17. The transfer sheet of claim 16, wherein the protective layer is a parchment paper.

18. The transfer sheet of claim 16, wherein the protective layer has a thickness of less than about 2.5 mils.

19. The transfer sheet of claim 8, wherein the image transfer layer comprises a first layer and a second layer, the second layer comprising an ink receptor, wherein the second layer comprises first and second components each comprising an EAA copolymer, wherein the second component comprises less than about 20% acrylic acid by weight of the EAA copolymer.

20. A transfer sheet for transferring an image onto a substrate, the transfer sheet comprising:

a support layer;

an image transfer layer overlying the support layer, wherein the image transfer layer comprises a first layer and a second layer, the second layer comprising an ink receptor, wherein the first layer comprises a binder; and a release layer between the support layer and the first layer, wherein the release layer comprises a crosslinking agent, wherein the release layer is less than about 3 pounds/1300 $ft^2$.

21. A transfer sheet for transferring an image onto a substrate, the transfer sheet comprising:

a support layer;

an image transfer layer overlying the support layer, wherein the image transfer layer comprises a first layer and a second layer, the second layer comprising an ink receptor, wherein the first layer comprises a binder; and a release layer between the support layer and the first layer, wherein the release layer comprises a crosslinking agent, wherein the release layer is cured at a degree of curing of at least about 80% prior to applying the image transfer layer to the release layer.

* * * * *